United States Patent
Yoon

(10) Patent No.: US 10,266,213 B2
(45) Date of Patent: Apr. 23, 2019

(54) TRACTOR

(71) Applicant: LS MTRON LTD., Anyang-si, Gyeonggi-do (KR)

(72) Inventor: Ji Won Yoon, Seoul (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 159 days.

(21) Appl. No.: 15/538,040

(22) PCT Filed: Dec. 24, 2015

(86) PCT No.: PCT/KR2015/014244
§ 371 (c)(1),
(2) Date: Jun. 20, 2017

(87) PCT Pub. No.: WO2016/105151
PCT Pub. Date: Jun. 30, 2016

(65) Prior Publication Data
US 2017/0334490 A1    Nov. 23, 2017

(30) Foreign Application Priority Data

Dec. 26, 2014  (KR) .................. 10-2014-0190973
Apr. 1, 2015   (KR) .................. 10-2015-0046085

(51) Int. Cl.
*B62D 33/06* (2006.01)

(52) U.S. Cl.
CPC ................ *B62D 33/0604* (2013.01)

(58) Field of Classification Search
CPC ................................. B62D 33/0604
See application file for complete search history.

(56) References Cited

U.S. PATENT DOCUMENTS

| 3,656,799 A | * | 4/1972 | Malm | B62D 33/0621 |
| | | | | 180/89.12 |
| 4,203,499 A | * | 5/1980 | Miyata | B60K 5/1216 |
| | | | | 180/312 |
| 4,271,921 A | * | 6/1981 | Ochsner | B62D 33/0604 |
| | | | | 180/89.12 |
| 5,590,733 A | * | 1/1997 | Ljungholm | B62D 33/0608 |
| | | | | 180/89.14 |

(Continued)

FOREIGN PATENT DOCUMENTS

JP    11-115826 A    4/1999
JP    11-268665 A    10/1999

(Continued)

OTHER PUBLICATIONS

International Search Report, dated Feb. 26, 2016, for International Application No. PCT/KR2015/014244.

(Continued)

*Primary Examiner* — Nicole T Verley
(74) *Attorney, Agent, or Firm* — K&L Gates LLP

(57) ABSTRACT

A tractor includes a cabin composed of a plurality of frames; a vehicle body installed at an lower portion of the cabin and composed of a guide bar, an engine and a transmission to supply power; links connecting the cabin and the transmission at a front portion; first and second front elastic cylinders installed at one side of the links; and first and second rear elastic cylinders connecting the cabin and the transmission at a rear portion.

13 Claims, 14 Drawing Sheets

(56) References Cited

U.S. PATENT DOCUMENTS

| | | | | |
|---|---|---|---|---|
| 6,206,121 | B1 * | 3/2001 | Michel | B60G 17/025 180/89.13 |
| 6,758,294 | B2 * | 7/2004 | Peddycord | B62D 33/0604 180/89.12 |
| 8,312,955 | B2 * | 11/2012 | Kawashiri | B62D 21/186 180/312 |
| 8,434,581 | B2 * | 5/2013 | Buhl | B60G 99/008 180/89.12 |
| 8,534,411 | B2 * | 9/2013 | Hirai | B60G 7/02 180/298 |
| 8,608,234 | B2 * | 12/2013 | Haeusler | B60G 99/006 280/124.106 |
| 8,807,633 | B2 * | 8/2014 | Milburn | B62D 33/0604 280/756 |
| 8,820,456 | B2 * | 9/2014 | Virtanen | B62D 33/0608 180/89.12 |
| 9,487,249 | B2 * | 11/2016 | Scott | B62D 33/0604 |
| 9,982,413 | B2 * | 5/2018 | Paolini | E02F 9/166 |
| 2010/0219009 | A1 * | 9/2010 | Turco | B62D 33/0608 180/89.15 |
| 2018/0022401 | A1 * | 1/2018 | Tauber | B62D 33/067 180/89.14 |
| 2018/0201331 | A1 * | 7/2018 | Helm | B62D 33/0604 |

FOREIGN PATENT DOCUMENTS

| | | |
|---|---|---|
| JP | 2006-027342 A | 2/2006 |
| JP | 2011-230693 A | 11/2011 |
| JP | 2012-056547 A | 3/2012 |
| KR | 10-2002-0007701 A | 1/2002 |

OTHER PUBLICATIONS

Written Opinion, dated Feb. 26, 2016, for International Application No. PCT/KR2015/014244.

* cited by examiner

TRACTOR

CROSS-REFERENCE TO RELATED APPLICATION(S)

The present application is a U.S. National Phase entry from International Application No. PCT/KR2015/014244, filed Dec. 24, 2015, which claims priority to Korean Patent Application Nos. 10-2014-0190973, filed Dec. 26, 2014, and 10-2015-0046085, filed Apr. 1, 2015, the disclosures of which are incorporated by reference herein in their entireties.

BACKGROUND OF THE INVENTION

1. Field of the Invention

This disclosure relates to a tractor for mitigating vibrations transmitted from a vehicle body to a cabin, and more particularly, to a tractor capable of mitigating vibrations transmitted from a vehicle body to a cabin constituting a riding and driving area when the tractor is in operation.

2. Description of Related Art

Generally, a tractor is mounted to an engine for power generation. The tractor travels by using the power supplied from the engine and performs most works carried out in agriculture by attaching a working machine such as a harrow and a plow to one side thereof.

The tractor includes a vehicle body having a guide bar for mounting a radiator, a battery or the like, an engine connected to the guide bar, and a transmission located at the rear of the engine and connected to the engine.

A steering front wheel is mounted to the guide bar via a front axle, and a driving rear wheel for driving the vehicle is mounted to the transmission. In addition, a riding and driving area for giving a seating place to a user is installed at an upper side of the transmission, and the inner space of the riding and driving area is divided by a cabin composed of a plurality of frames and a glass.

If power is generated by the engine and the tractor is started, the tractor may travel or stop and perform a predetermined task in a started state. When a certain task is performed by the tractor, vibrations are generated in various directions such as forward and backward directions, upper and lower directions, and right and left directions due to vibrations generated from the engine, shocks caused due to road conditions while travelling, and impacts caused due to a state of a workplace. Such vibrations are transmitted to the cabin through the vehicle body of the tractor, and the vibrations transmitted to the cabin are transmitted to the user as they are, which reduces riding impression and comfort.

In order to solve this problem, in an existing technique, the vehicle body and the cabin are connected by installing a bracket having a groove in each of the transmission and the cabin and then connecting the transmission and the cabin to the groove by means of a fastening member such as a bolt. In addition, in order to alleviate the vibration of the cabin, an elastic body such as rubber is installed to surround the fastening member.

However, even though this technique is used, the vibration transmitted from the transmission to the cabin is so strong that there is a limit for the elastic body such as rubber to absorb the vibration of the cabin.

Korean Unexamined Patent Publication No. 2002-0007701 discloses a technique for reducing vibrations transmitted to the cabin. In detail, this document is directed to a cabin vibration absorbing structure of a truck, in which a hydraulic cylinder is installed between a cabin and a vehicle body frame, and an oil of the hydraulic cylinder absorbs the impact of the cabin. Thus, the vibration of the cabin may be reduced by free movement of oil.

However, even if the technology of this document is applied to a tractor, it is difficult to reduce vibrations of the cabin simply by using the free movement of oil. Also, according to this technology, it is not easy to consider that vibrations of the cabin occur in various directions. Thus, this technique may not be an appropriate solution to mitigate vibrations transmitted to the cabin in various directions.

SUMMARY OF THE INVENTION

This disclosure is designed to solve the above limitations and problems of the existing technique, and the present disclosure is directed to providing a tractor which may improve riding impression and comfort of a user by mitigating vibrations transmitted from a vehicle body to a cabin.

In one general aspect, there is provided a tractor, comprising: a cabin composed of a plurality of frames and configured to provide a seating space of a user; a vehicle body installed at an lower portion of the cabin and composed of a guide bar, an engine and a transmission to supply power; links having one end coupled to a front portion of the cabin and the other end coupled to a front portion of the transmission to connect the cabin and the transmission at a front portion; front elastic cylinders installed at one side of the links, an elastic member surrounding the front elastic cylinders to mitigate vibrations of the cabin; and rear elastic cylinders having one end coupled to a rear portion of the cabin and the other end coupled to a rear portion of the transmission to connect the cabin and the transmission at a rear portion, an elastic member surrounding the elastic cylinders to mitigate vibrations of the cabin.

In addition, the links may include a first link and a second link extending in forward and rearward directions, and a central link extending in a lateral direction to connect one end of the first link and one end of the second link, and the first and second front elastic cylinders may be installed at the first link and the second link, respectively.

In addition, the first and second front elastic cylinders may extend upward and downward directions and be coupled to transmission side brackets formed at one side of the transmission and fixed to the transmission.

In addition, when one side of the first link coupled to the transmission and one side of the second link coupled to the transmission pivot upwards, the first and second front elastic cylinders may be compressed to mitigate an upward impact transmitted to the cabin, and when one side of the first link coupled to the transmission and one side of the second link coupled to the transmission pivot downwards, the first and second front elastic cylinders may be tensioned to mitigate a downward impact transmitted to the cabin.

In addition, the central link may extend in a lateral direction so that the first link and the second link are coupled to both ends thereof, to mitigate shaking in the lateral direction transmitted to the cabin.

In addition, a first transmission front bracket coupled to one end of the first link may be installed at one side of the transmission, a second transmission front bracket coupled to one end of the second link may be installed at the other side of the transmission, a hole may be formed at one end of the first link so that the first transmission front bracket is inserted therein and a first damper made of an elastic material is installed at an inner circumference thereof, and a hole may be formed at one end of the second link so that the second transmission front bracket is inserted therein and a second damper made of an elastic material is installed at an inner circumference thereof.

In addition, a hole may be formed at the other end of the first link so that one end of the central link is perpendicularly inserted therein and a third damper made of an elastic material is installed at an inner circumference thereof, and a hole may be formed at the other end of the second link so that the other end of the central link is perpendicularly inserted therein and a fourth damper made of an elastic material is installed at an inner circumference thereof.

In addition, a first cabin front bracket and a second cabin front bracket disposed between the first link and the second link and coupled to the central link may be installed at the front of the cabin, a hole may be formed in the first cabin front bracket so that one side of the central link is inserted therein and a fifth damper made of an elastic material is installed at an inner circumference thereof, and a hole may be formed in the second cabin front bracket so that the other side of the central link is inserted therein and a sixth damper made of an elastic material is installed at an inner circumference thereof.

In addition, one end of the first and second rear elastic cylinders may be coupled to a cabin rear bracket formed at the rear of the cabin, and the other end thereof may be coupled to a transmission rear bracket formed at the rear of the transmission.

In addition, protruding links extending in a lateral direction may be installed at the first link and the second link, respectively, and the first and second front elastic cylinders may be installed at the protruding links.

In addition, a first fixed member and a second fixed member protruding outwards may be installed to the cabin, a roller may be installed at the first fixed member and the second fixed member, respectively, and the roller may mitigate vertical and horizontal vibrations by means of guide frames fixed to the transmission.

In addition, the guide frames may include a first guide frame and a second guide frame installed in parallel with each other.

As another example, the guide frames may include a first guide frame and a second guide frame installed perpendicular to each other.

Advantageous Effects

According to the present disclosure proposed herein, a link is installed at a front portion and a rear elastic cylinder is installed at a rear portion to connect a cabin and a transmission, so that vibrations generated by the transmission may be mitigated and transmitted to the cabin, thereby improving riding comfort of a user.

Also, since the front elastic cylinder is installed at one side of the link, the degree of freedom of location where the front elastic cylinder is installed is improved, so that it is possible to effectively reduce vibrations of the cabin generated in various directions.

In addition, since a guide frame of an inversed "U" shape is formed at one side of the cabin, it is possible to assist reduction of vertical and horizontal vibrations of the cabin.

DETAILED DESCRIPTION OF THE INVENTION

Figure 1:
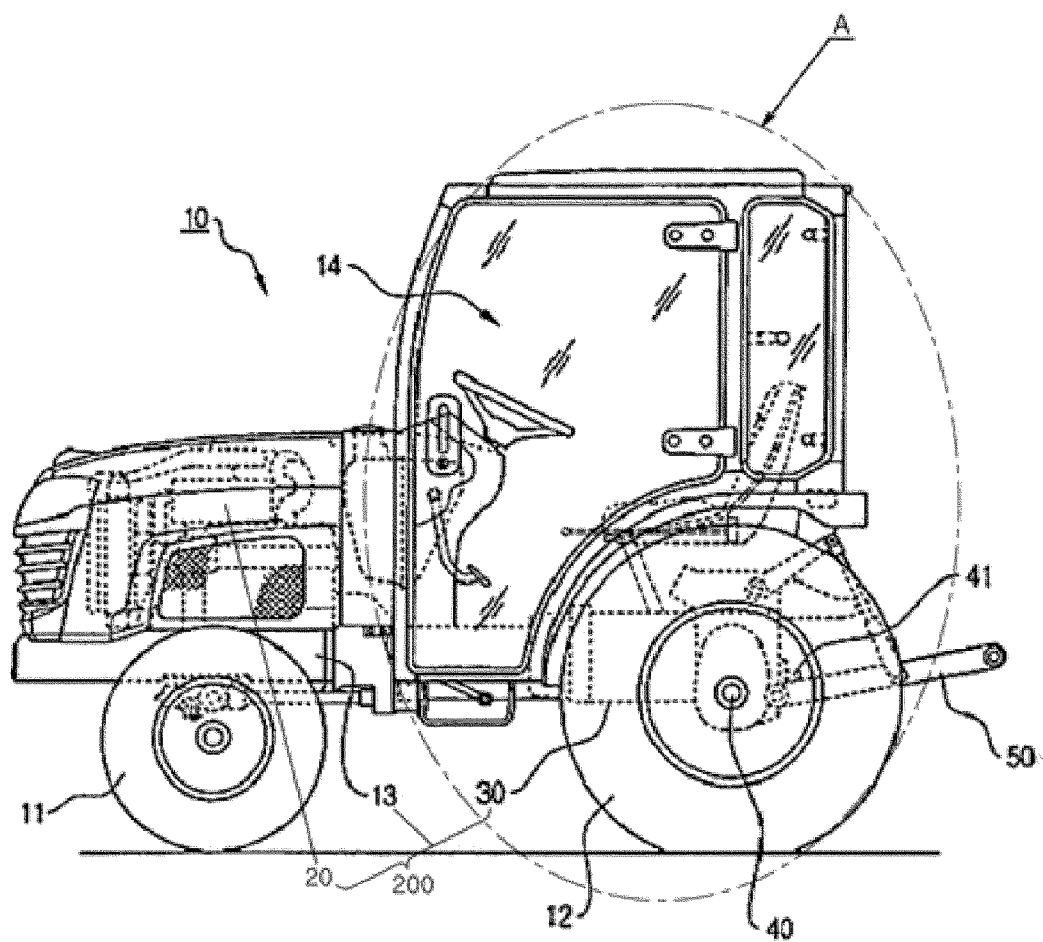
FIG. 1 is a side view showing an overall configuration of a tractor according to the present disclosure.

Hereinafter, an embodiment of the present disclosure will be described with reference to the drawings. Even though the present disclosure is described based on the embodiment depicted in the drawings, this is just an example, and the essential configuration and operations of the present disclosure are not limited thereto.

FIG. 1 is a side view showing an overall configuration of a tractor according to the present disclosure. Referring to FIG. 1, a tractor 10 according to the present disclosure includes a steering front wheel 11 for adjusting a travelling direction of a vehicle and a driving rear wheel 12 for driving the vehicle. The steering front wheel 11 is coupled to a guide bar 13 via an axle.

In addition, an engine 20 and a transmission 30 are mounted in the tractor 10, in order from the front to the rear. The guide bar 13, the engine 20, and the transmission 30 may be collectively referred to as a vehicle body 200.

Also, a riding and driving area 14 is provided at an upper portion of the guide bar 13 disposed at the rear of the engine 20, and a rear axle 40 for driving a rear wheel 12 is mounted to the transmission 30. At a PTO transmission unit of the transmission 30, a PTO shaft 41 extends to the rear of the transmission 30 to provide power to a lifting device 50 at the rear of the tractor 10.

Figure 2:
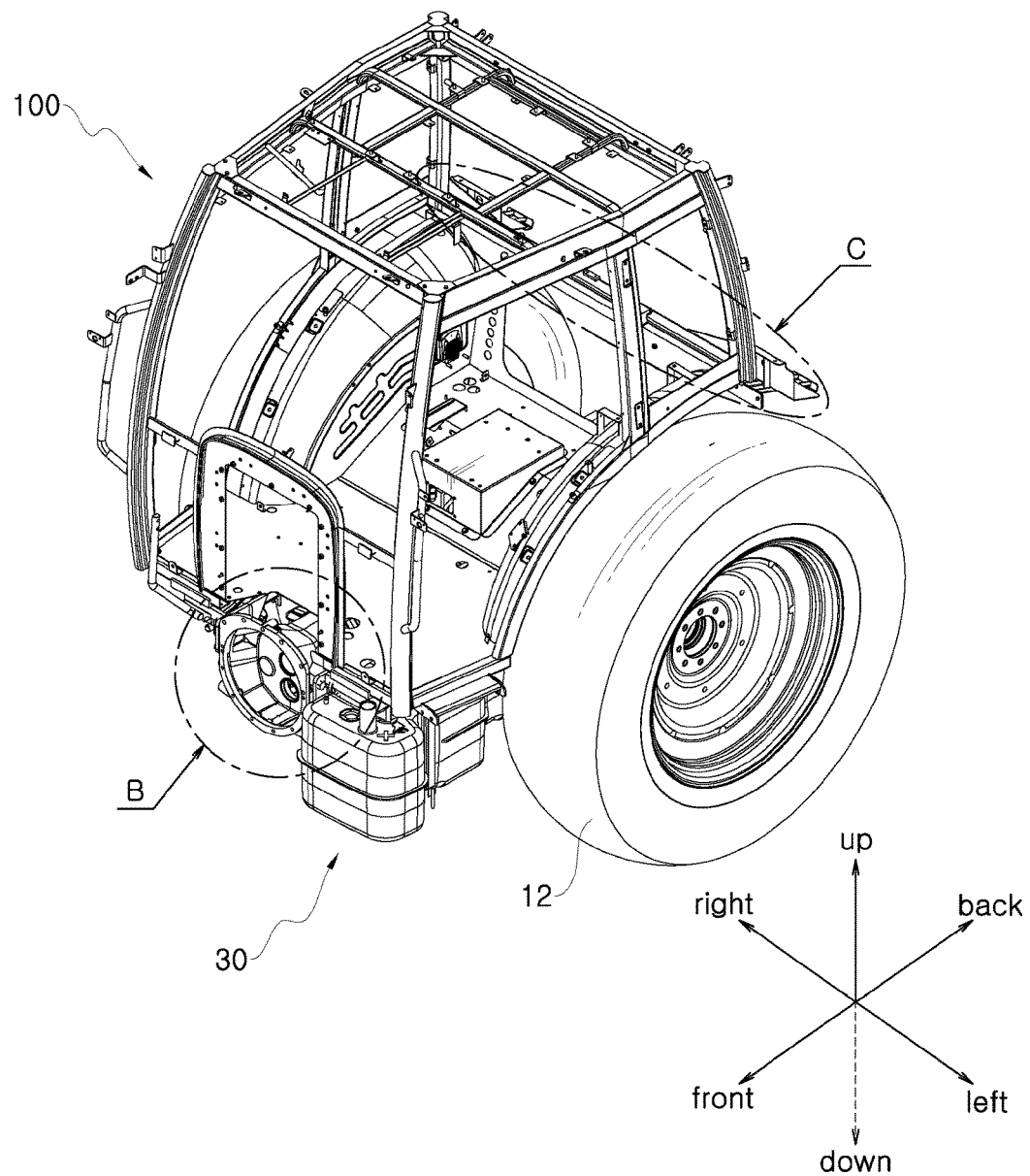
FIG. 2 is an enlarged perspective view showing a portion A of FIG. 1.

FIG. 2 is an enlarged perspective view showing a portion A of FIG. 1.

Referring to FIGS. 1 and 2, the tractor according to the present disclosure includes a cabin 100 in which the riding and driving area 14 is provided and a transmission 30 located under the cabin 100 and powered by the engine 20 as a component of the vehicle body 200.

The cabin 100 is shaped so that a plurality of frames are combined. In addition, a user may ride in the interior space formed by the plurality of frames in order to operate the tractor. When the user starts the tractor, the engine 20 is driven, causing the vehicle body 200 to vibrate. The vehicle body 200 may also vibrate when the tractor 10 travels on the road, or the vehicle body 200 may also vibrate depending on the condition of a work place for the tractor 10. As another example, the vehicle body 200 may vibrate according to the state of a farmland when the tractor 10 is used for farming.

The vibration generated from the engine 20, the vibration generated when the tractor 10 travels on the road, and the vibration caused by the farming work of the tractor 10 are transmitted to the cabin 100 located at the upper portion of the vehicle body 200. At this time, the user riding in the cabin 100 may feel discomfort due to such vibrations.

Accordingly, the tractor according to the present disclosure includes a shock absorber to mitigate the vibrations of the cabin 100, thereby reducing the inconvenience of the user. Hereinafter, the shock absorber will be described in detail.

Figure 3A:
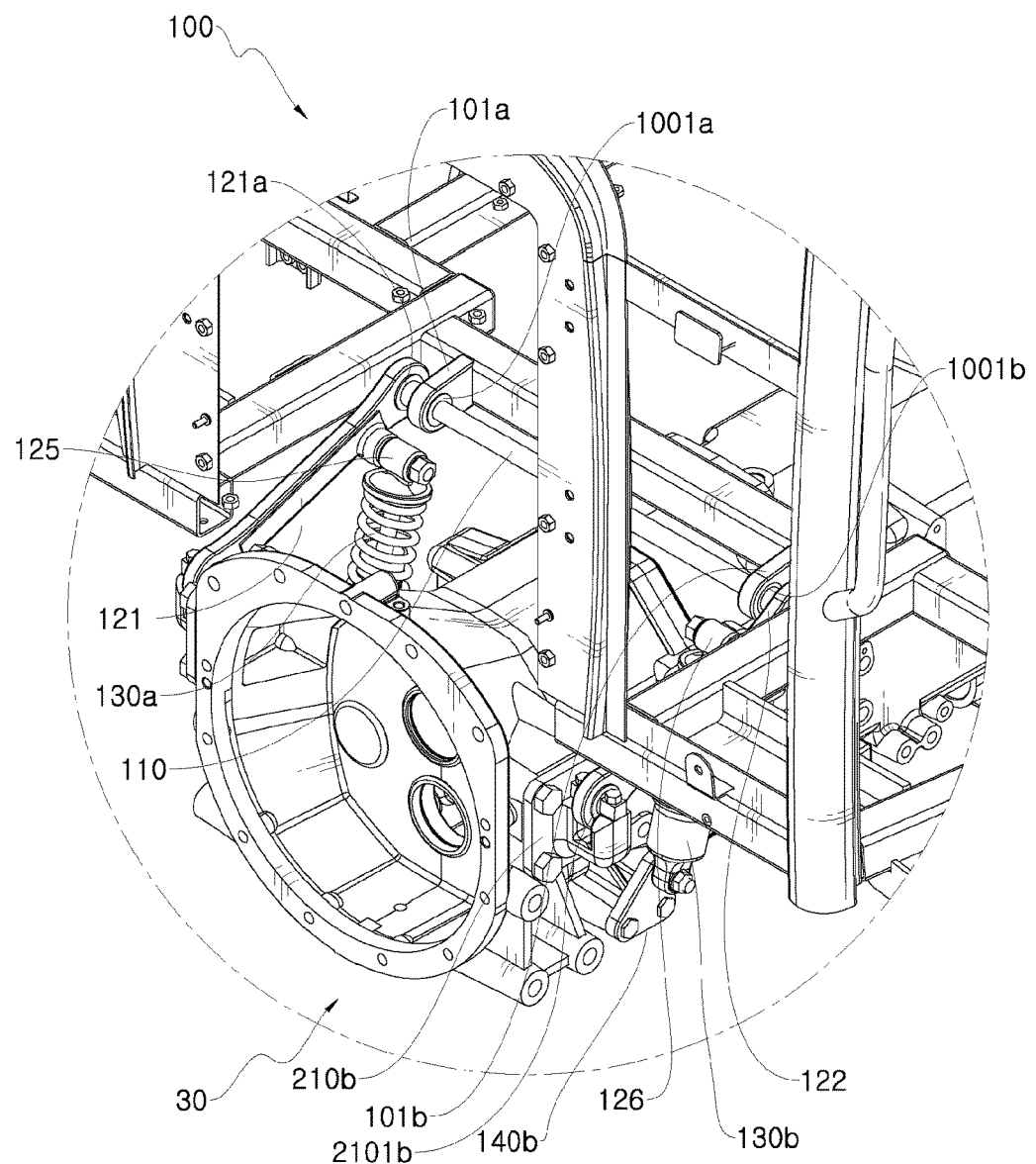
FIG. 3A is an enlarged perspective view showing an upper portion of a portion B of FIG. 2.
Figure 3B:
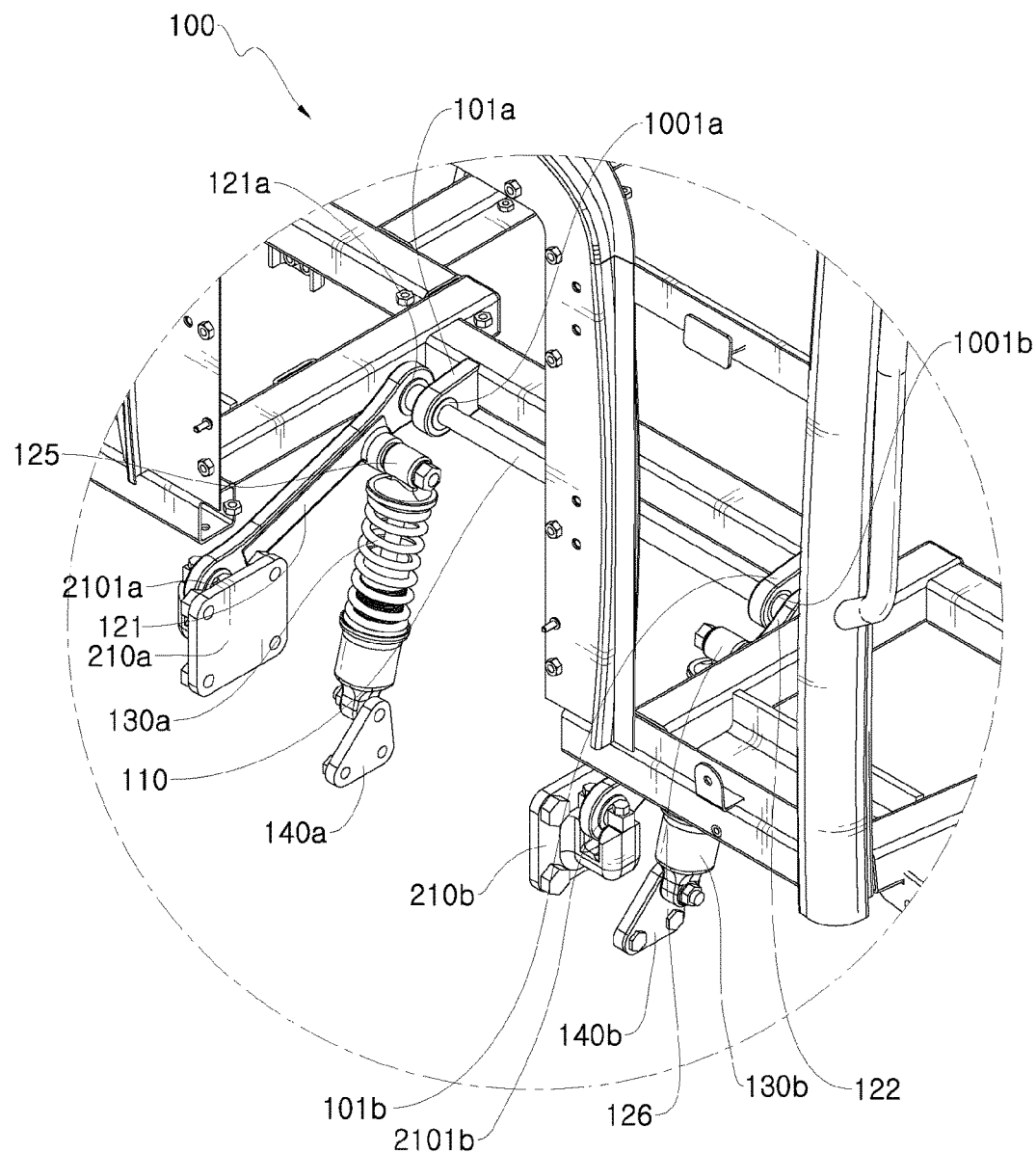
FIG. 3B is a diagram showing that a transmission is excluded from FIG. 3A.
Figure 4A:
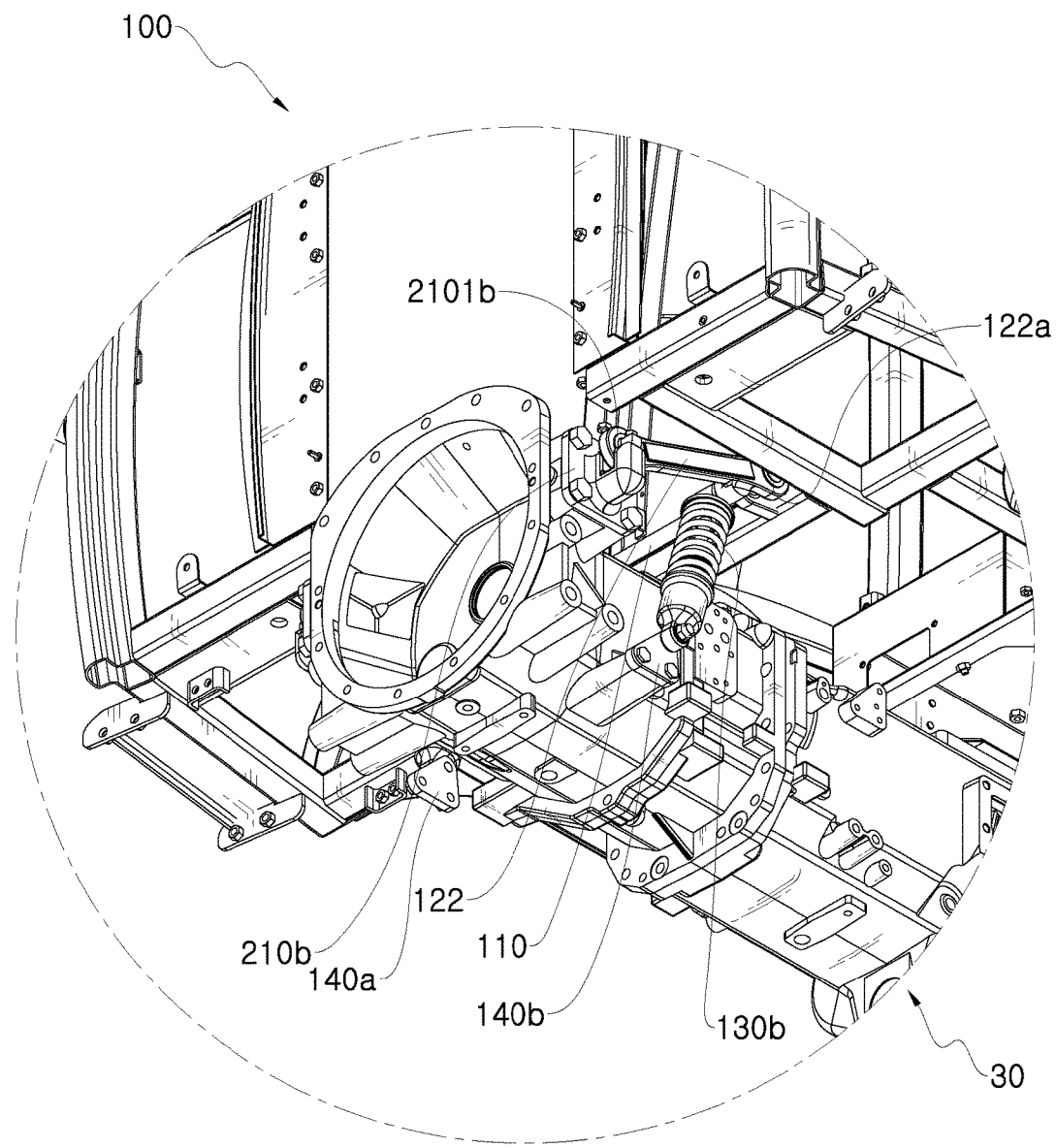
FIG. 4A is an enlarged perspective view showing a lower portion of the portion B of FIG. 2.
Figure 4B:
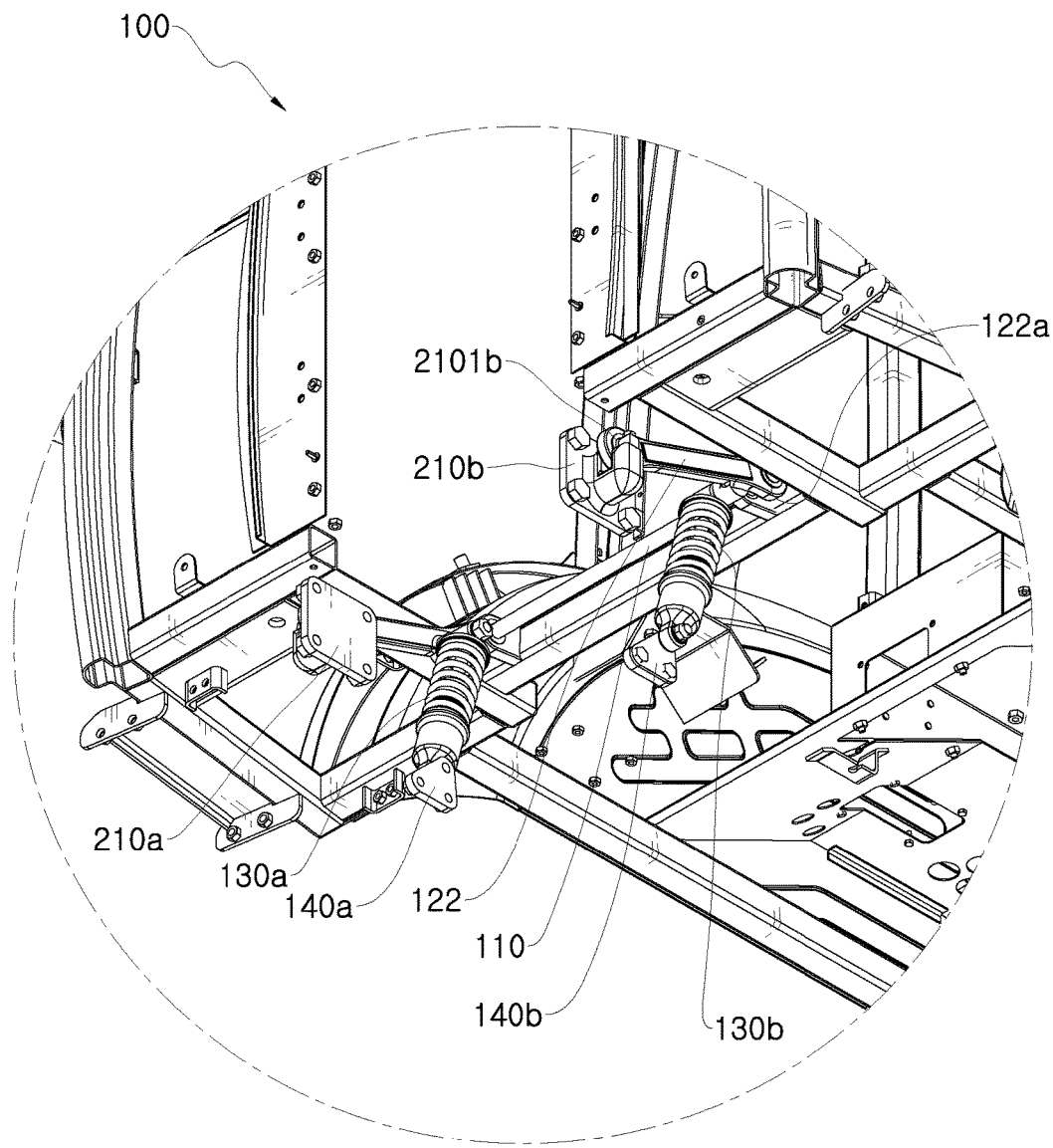
FIG. 4B is a diagram showing that the transmission is excluded from FIG. 4A.

FIG. 3A is an enlarged perspective view showing an upper portion of a portion B of FIG. 2, and FIG. 3B is a diagram showing that a transmission is excluded from FIG. 3A. Also, FIG. 4A is an enlarged perspective view showing a lower portion of the portion B of FIG. 2, and FIG. 4B is a diagram showing that the transmission is excluded from FIG. 4A.

Referring to FIGS. 3A to 4B, cabin front brackets 101a, 101b and transmission front brackets 210a, 210b are installed at the front of the cabin 100 and the transmission 30, respectively. In other words, the cabin front brackets 101a, 101b are installed at the front of the cabin 100, and the transmission front brackets 210a, 210b are installed at a side of the front of the transmission 30.

In this specification, a forward direction refers to the direction from a rear wheel (see the reference sign 12 in FIG. 1) to a front wheel (see a reference sign 11 in FIG. 1), and a backward direction refers to a direction opposite thereto (see FIG. 2).

The cabin front brackets 101a, 101b and the transmission front brackets 210a, 210b are coupled by links made of a rigid material.

The links include a first link 121 and a second link 122 extending in the forward and rearward directions, and a central link 110 connecting the end of the first link 121 and the end of the second link 122 and disposed between the first link 121 and the second link 122. The central link 110 may extend in a lateral direction.

In this specification, a left direction refers to a direction from the front wheel disposed at the right side to the front wheel disposed at the left side, and a right direction refers to a direction opposite thereto (see FIG. 2).

By means of the central link 110, the first link 121 and the second link 122 having a bar shape of a rigid material, the tractor may ensure the straightness while travelling, and when the tractor changes its travelling direction, the vertical and lateral shakes may be minimized to enhance the driving safety.

The cabin front bracket includes a first cabin front bracket 101a disposed adjacent to the first link 121 and a second cabin front bracket 101b disposed adjacent to the second link 122. The first and second cabin front brackets 101a, 101b may extend in the forward and rearward directions.

A hole is formed in each of the cabin front brackets 101a, 101b so that the central link 110 may pass through it. In other words, the cabin front brackets 101a, 101b and the central link 110 may be coupled to each other as the central links 110 sequentially pass through the holes. Therefore, the central link 110 mitigates the left and right shaking transmitted to the cabin 100, thereby providing comfort to the user.

For example, if the tractor 10 travels forward on a downwardly inclined terrain to the right, namely when the tractor 10 travels forward in a tilted state to the right, the transmission 30 receives a force in a right direction (a force from the second link 122 toward the first link 121). Accordingly, a driver riding in the riding and driving area 14 of the cabin 100 can feel inconvenience when driving the tractor 10 since the driver rides in the cabin 100 inclined to the right. However, in the present disclosure, the central link 110 connecting the first link 121 and the second link 122 is installed to mitigate the impacts.

Specifically, the rightward force transmitted to the transmission 30 is transmitted to the first link 121 and the second link 122 via first and second transmission front brackets 210a, 210b. Accordingly, the first link 121 receives a relatively downward force in comparison to the second link 122. However, between the first link 121 and the second link 122, the central link 110 extending in a lateral direction to align the positions of the first link 121 and the second link 122 is installed. Accordingly, the left and right shakes of the first link 121 and the second link 122 are reduced by the central link 110 (the heights of the first link and the second link are maintained in a similar state), the impact applied to the tractor 10 when the tractor 10 travels on a downwardly declining terrain to the right may be mitigated, thereby reducing the right and left shakes transmitted to the cabin 100.

Similarly, if the tractor 10 travels forward on a downwardly inclined terrain to the left, namely when the tractor 10 travels forward in a tilted state to the left, the transmission 30 receives a force in a left direction (a force from the first link 121 toward the second link 122). The leftward force transmitted to the transmission 30 is transmitted to the first link 121 and the second link 122 via the first and second transmission front brackets 210a, 210b. Accordingly, the second link 122 receives a relatively downward force in relation to the first link 121. However, the left and right shakes of the first link 121 and the second link 122 are reduced (the heights of the first link and the second link are maintained in a similar state) by the central link 110, and thus the impact applied to the tractor 10 while the tractor 10 is travelling on a downwardly declining terrain to the left may be mitigated, thereby reducing the right and left shakes transmitted to the cabin 100.

Now, the coupling relationship between the link and the first and second transmission front brackets 210a, 210b will be described. Here, the transmission front brackets 210a, 210b are coupled into each corresponding hole formed at the end of the first link 121 or the second link 122 by means of a coupling member such as screws and bolts.

According to the present disclosure, in order to further mitigate the noise or impact transmitted from the transmission 30 to the cabin 100, a damper having a predetermined elastic material is installed at a coupled portion between the transmission 30 and the first link 121 or the second link 122, at a coupled portion between the first link 121 or the second link 122 and the central link 110, and at a coupled portion between the central link 110 and the cabin 100.

In detail, holes for inserting one sides of the first transmission front bracket 210a and the second transmission front bracket 210b are respectively formed at the one end of the first link 121 and one end of the second link 122. In addition, a first damper 2101a and a second damper 2101b with a predetermined elastic force are installed on inner surfaces of the holes, respectively. Thus, even if the tractor 10 is traveling on an unstable terrain such as a slope or a protrusion, the impact transmitted from the transmission 30 to the first link 121 or the second link 122 may be greatly mitigated by the first damper 2101a and the second damper 2101b.

In addition, a predetermined hole is formed at the other end of the first link 121 so that one end of the central link 110 is inserted therein. The first link 121 and the central link 110 extend perpendicularly to each other, and the central link 110 is inserted into the hole formed at the other end of the first link 121, so that the central link 110 and the first link 121 are coupled perpendicularly. Similarly, at the other end of the second link 122, a predetermined hole for inserting the other end of the central link 110 is formed. The second link 122 and the central link 110 extend perpendicular to each other, and the central link 110 is inserted into the hole formed at the other end of the second link 122, so that the central link 110 and the second link 122 are coupled perpendicular to each other. Accordingly, the first link 121, the central link 110 and the second link 122 are integrally combined with each other to have a '⊂' shape as a whole. Therefore, even if the tractor 10 travels on an inclined terrain to the left or right, it is possible to greatly mitigate that the cabin 100 leans to the left or right by means of the links 110, 121 and 122 of a '⊂' shape.

Moreover, a third damper 121a having a predetermined elastic force is installed on an inner surface of the hole formed at the other end of the first link 121, and a fourth damper 122a having a predetermined elastic force is installed on an inner surface of the hole formed at the other end of the second link 122, respectively. Thus, even if the tractor 10 is traveling on an unstable terrain such as a slope or protrusion, the impact transmitted from the first link 121 or second link 122 to the central link 110 may be mitigated further by the third damper 121a and the fourth damper 122a, and particularly it is possible to mitigate that the cabin 100 is leaned to the right or left.

In addition, holes for inserting one side and the other side of the central link 110 are respectively formed in the first cabin front bracket 101a and the second cabin front bracket 101b. Also, a fifth damper 1001a and a sixth damper 1001b having a predetermined elastic force are installed on the inner surfaces of the holes, respectively. Thus, even if the tractor 10 is traveling on an unstable terrain such as a slope or protrusion, the impact or noise transmitted from the first link 121 and the second link 122 to the cabin 100 may be greatly mitigated by the fifth damper 1001a and the sixth damper 1001b.

Protruding links 125 and 126 protruding and extending toward the transmission 30 are respectively installed at the first link 121 and the second link 122. In detail, the first protruding link 125 protruding toward the second link 122 is installed at the first link 121, and the second protruding link 126 protruding toward the first link 121 is installed at the second link 122. Also, first and second front elastic cylinders 130a, 130b extending vertically and mitigating vertical vibrations of the cabin 100 are installed at the protruding links 125 and 126, respectively.

As another example, if one sides of the first and second front elastic cylinders 130a, 130b and the other sides of the first and second front elastic cylinders 130a, 130b are installed obliquely in a lateral direction, the first and second front elastic cylinders 130a, 130b may mitigate lateral vibrations as well as vertical vibrations and forward and rearward vibrations of the cabin 100.

In this specification, an upward direction refers to a direction from the transmission 30 toward the cabin 100, and a downward direction refers to a direction opposite thereto (see FIG. 2).

In addition, the first and second front elastic cylinders 130a, 130b have elastic members such as springs and coils on the outer surface thereof to mitigate vibrations transmitted from the transmission 30 to the cabin 100. Thus, in a state where one ends of the first and second front elastic cylinders 130a, 130b are fixed to the protruding links 125, 126, respectively, the other ends of the first and second front elastic cylinders 130a, 130b are fixed to the transmission side brackets 140a, 140b, respectively, thereby indirectly mitigating the vibrations of the cabin 100.

Hereinafter, the process of mitigating the impact transmitted to the cabin 100 by the first and second front elastic cylinders 130a, 130b will be described.

Figure 5A:
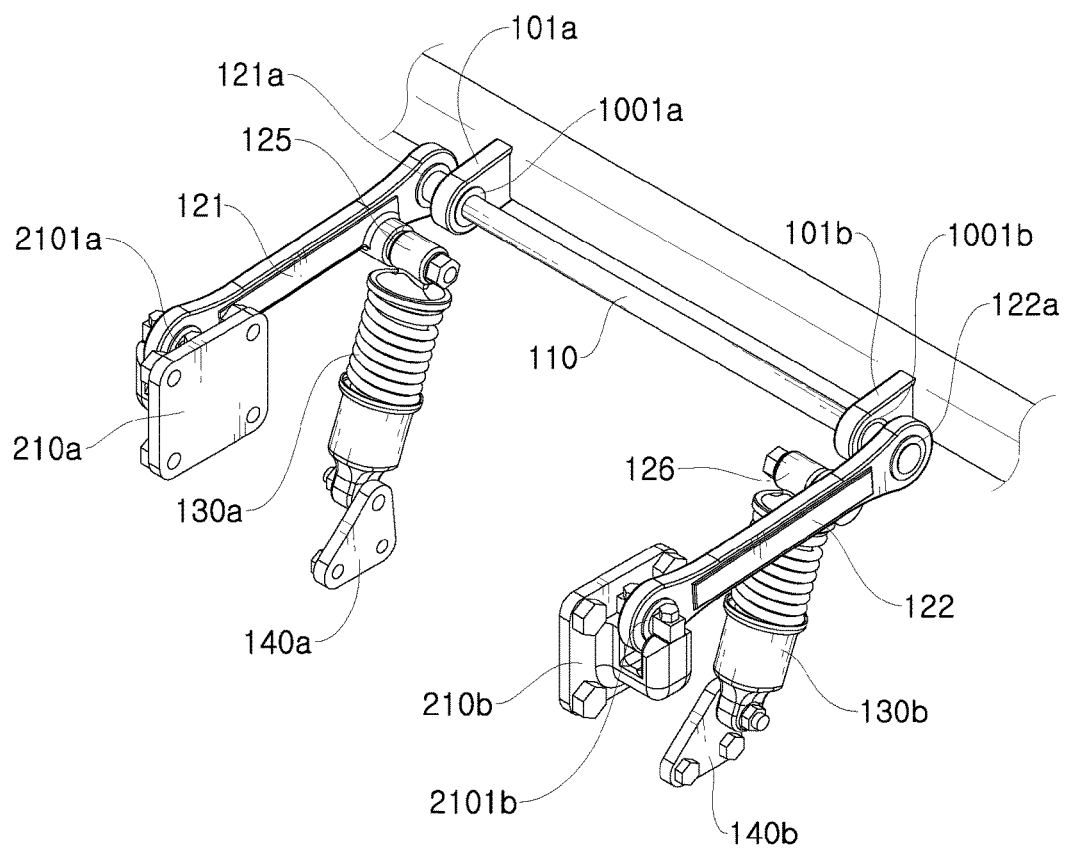
FIG. 5A is a diagram showing a configuration for mitigating impacts transferred from the transmission to the cabin when an upward force is applied to the transmission.
Figure 5B:
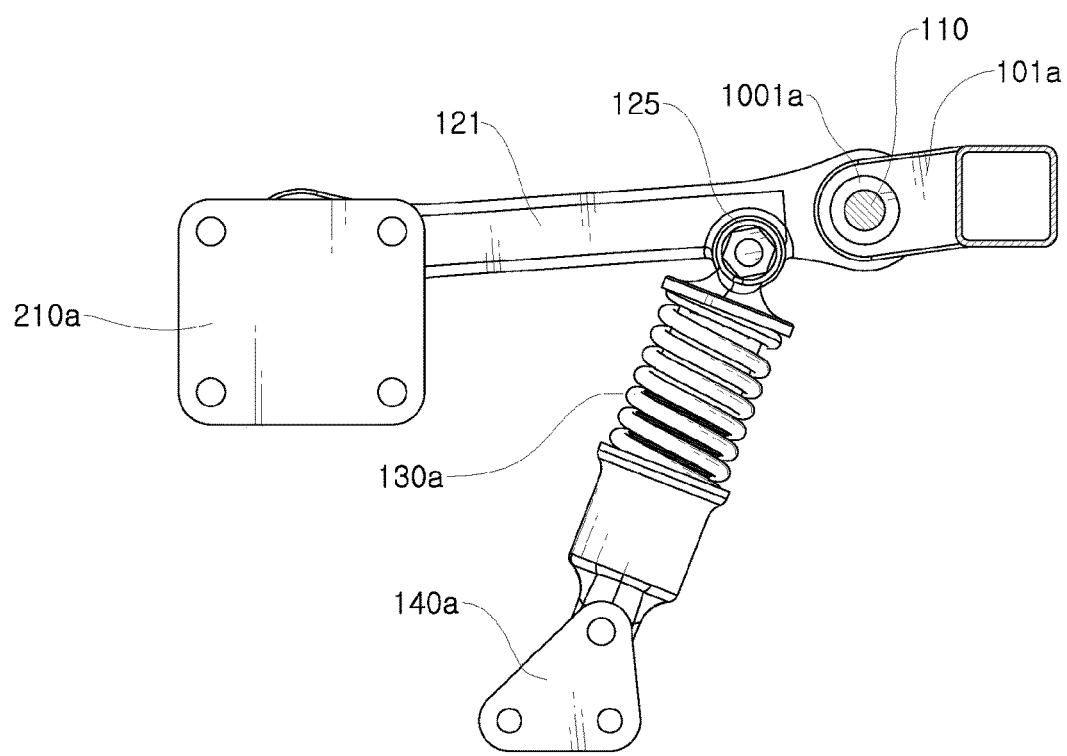
FIG. 5B is a side view of FIG. 5A.
Figure 6A:
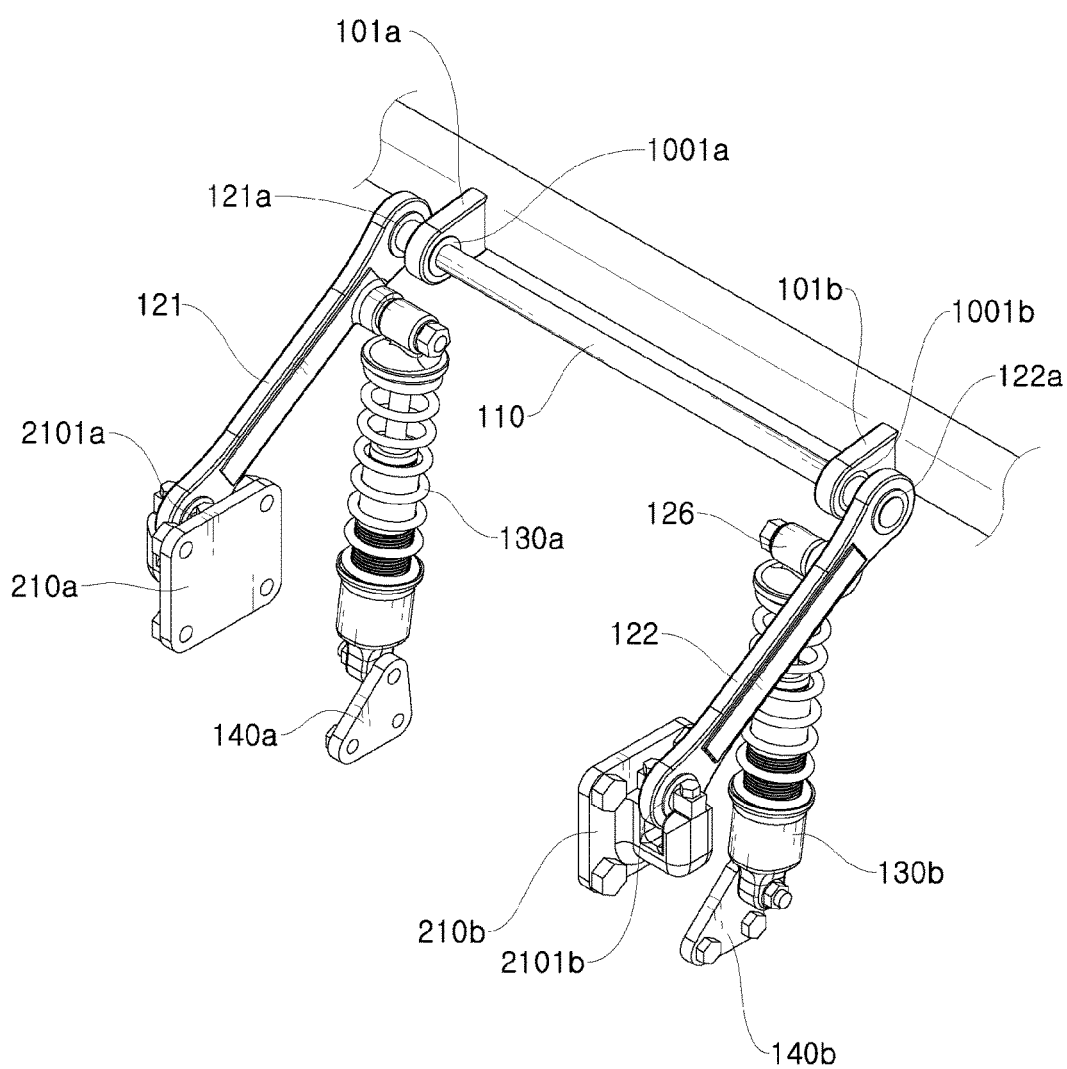
FIG. 6A is a diagram showing a configuration for mitigating impacts transferred from the transmission to the cabin when a downward force is applied to the transmission.
Figure 6B:
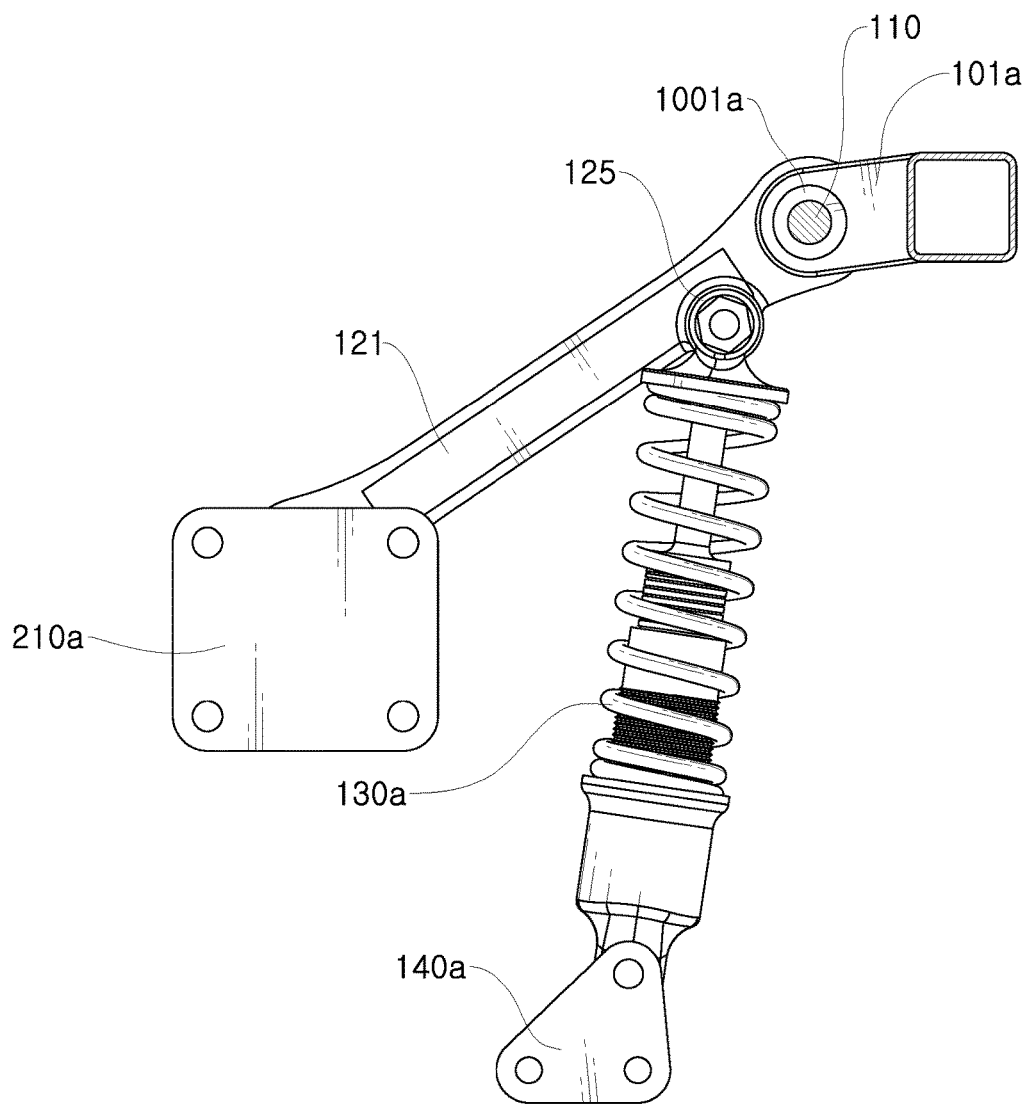
FIG. 6B is a side view of FIG. 6A.

FIGS. 5A and 5B are a perspective view and a side view for illustrating a process of mitigating impacts transferred from the transmission to the cabin when an upward force is applied to the transmission, and FIGS. 6A and 6B are a perspective view and a side view for illustrating a process of mitigating impacts transferred from the transmission to the cabin when a downward force is applied to the transmission.

First, referring to FIGS. 5A and 5B, when the tractor 10 is travelling on a road having a protrusion (for example, a speed bump) as an example, the front wheel 11 of the tractor moves up along the protrusion, and accordingly the transmission 30 is subjected to an upward force corresponding to the moving direction of the front wheel 11. In other words, the cabin 100 coupled to the upper portion of the transmission 30 receives this force, which may reduce the ride comfort of the user.

However, in the present disclosure, the first and second front elastic cylinders 130a and 130b having an elastic member wound on the outer surfaces thereof are installed between the cabin 100 and the transmission 30. Therefore, the upward force of the transmission 30 is transmitted to the cabin 100 via the first and second front elastic cylinders 130a, 130b. In detail, as the transmission 30 moves upward, one side of the first link 121 coupled with the transmission 30 and one side of the second link 122 coupled with the transmission 30 are moved upward (see FIG. 5B). Also, the first and second front elastic cylinders 130a, 130b are compressed according to the upward pivoting of one side of the first link 121 coupled with the transmission 30 and one side of the second link 122 coupled with the transmission 30, and the impact transmitted from the transmission 30 to the cabin 100 may be reduced by means of this compression operation.

On the contrary, FIGS. 6A and 6B show that the vibration or impact transmitted to the cabin 100 is reduced when the tractor 10 moves downward. For example, when the tractor 10 moves downward along a protrusion, the front wheel 11 of the tractor moves downward along the protrusion, so that transmission 30 coupled to the front wheel 11 receives a downward force.

The downward force of the transmission 30 is transmitted to the cabin 100 via the first and second front elastic cylinders 130a, 130b. In other words, as the transmission 30 moves downward, one side of the first link 121 coupled with the transmission 30 and one side of the second link 122 coupled with the transmission 30 are moved downward (see FIG. 6B). Also, the first and second front elastic cylinders 130a, 130b are tensioned by the downward pivoting of one side of the first link 121 coupled with the transmission 30 and one side of the second link 122 coupled with the transmission 30, and the impact transmitted from the transmission 30 to the cabin 100 may be reduced by the tensioning action.

In this embodiment, it has been described that the tractor 10 moves upward or downward along a protrusion. However, if the tractor 10 moves upward or downward to apply an upward or downward impact to the cabin 100, the structure as shown in FIG. 5A to FIG. 6B may be applied.

Figure 7A:
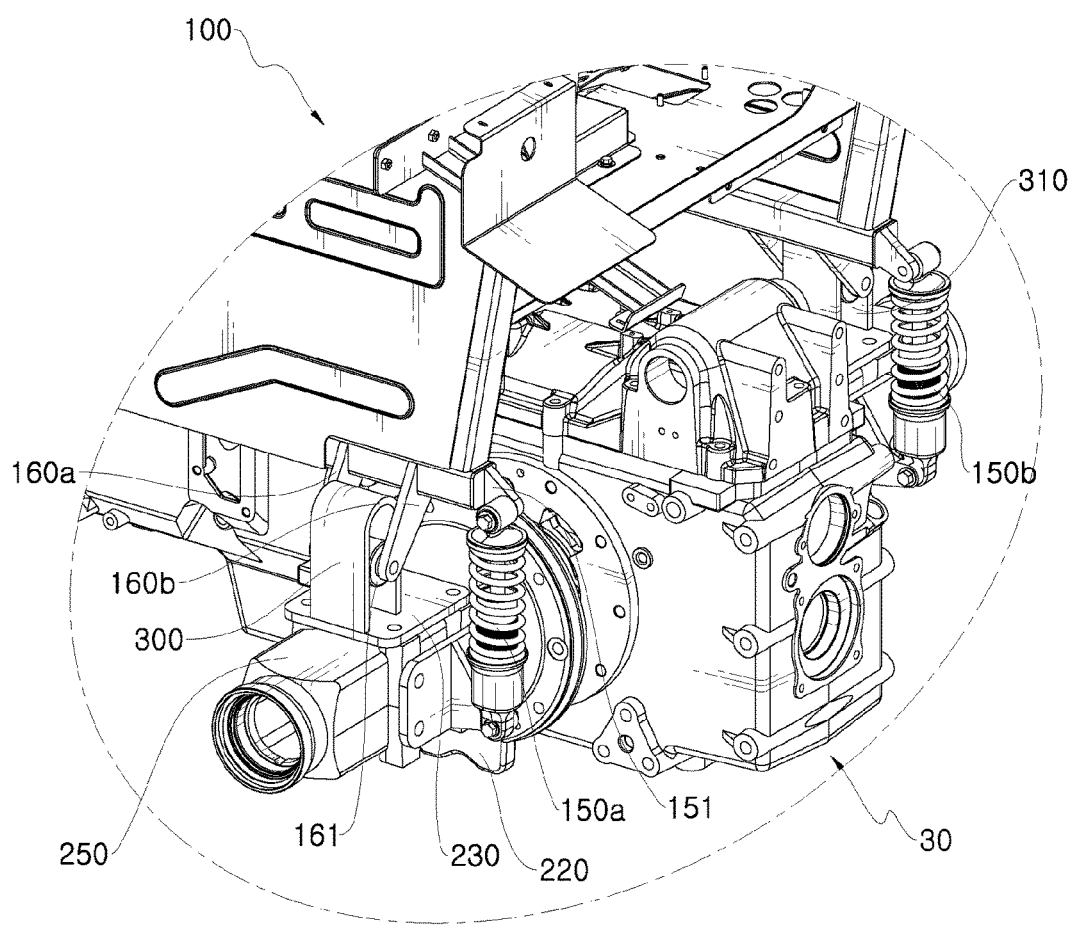
FIG. 7A is a perspective view showing an upper portion of a portion C of FIG. 2.
Figure 7B:
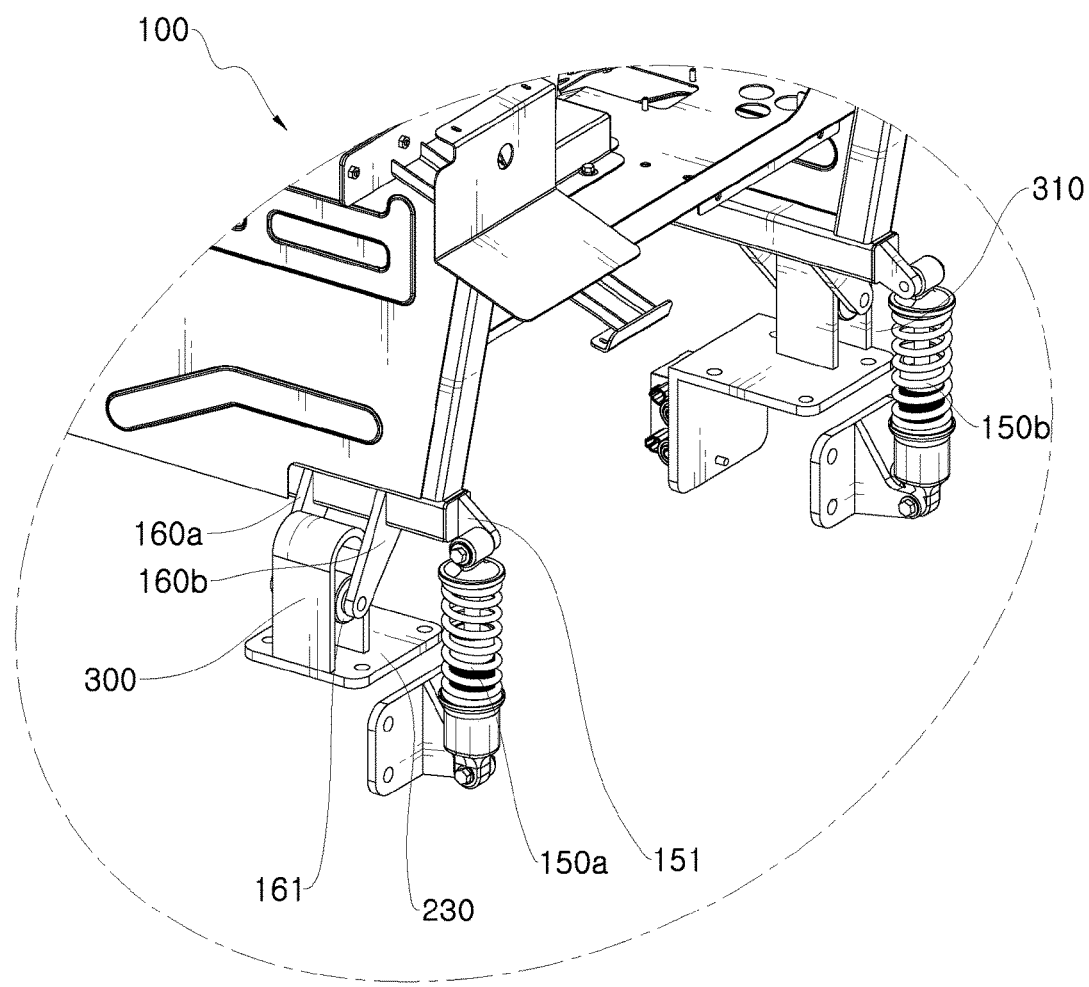
FIG. 7B is a diagram showing that the transmission is excluded from FIG. 7A.
Figure 8:
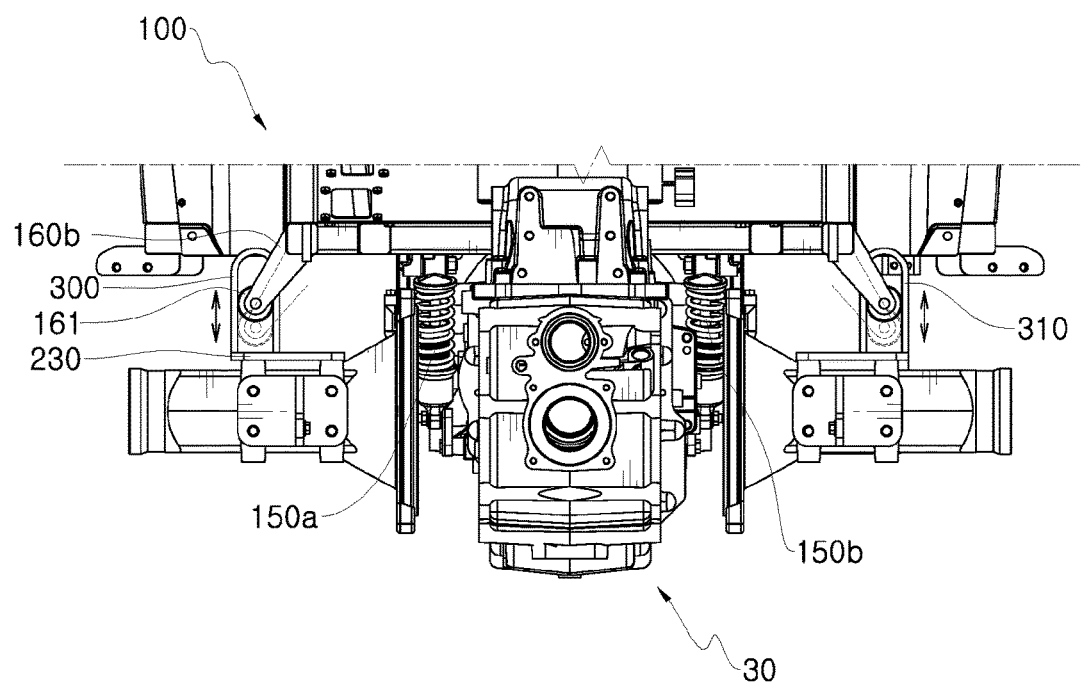
FIG. 8 is an enlarged rear view showing the portion C of FIG. 2 according to an embodiment of the present disclosure.

FIGS. 7A, 7B and 8 are rear views of the cabin 100 and the transmission 30. In detail, FIG. 7A is an enlarged perspective view showing an upper portion of a portion C of FIG. 2, and FIG. 7B is a diagram showing that the transmission is excluded from FIG. 7A. Also, FIG. 8 is an enlarged rear view showing the portion C of FIG. 2 according to an embodiment of the present disclosure.

Referring to FIGS. 7A, 7B and 8, a cabin rear bracket 151 is installed at the rear of the cabin 100, and a transmission rear bracket 220 is installed at the rear of the transmission 30. Between the cabin rear bracket 151 and the transmission rear bracket 220, first and second rear elastic cylinders 150a, 150b are installed. In other words, one sides of the first and second rear elastic cylinders 150a, 150b are coupled to the cabin rear bracket 151, respectively, and the other sides of the first and second rear elastic cylinders 150a, 150b are coupled to the transmission rear bracket 220, respectively.

The first and second rear elastic cylinders 150a, 150b may extend in a vertical direction and include elastic members such as springs and coils on the outer surfaces thereof to mitigate vertical vibrations of the cabin 100. In detail, when the tractor 10 is travelling upwards on an inclined terrain, the impact caused by an upward force transmitted to the transmission 30 is mitigated by the compression of the first and second rear elastic cylinders 150a, 150b and then transmitted to the cabin 100. Similarly, when the tractor 10 is travelling downwards, the impact caused by a downward force transmitted to the transmission 30 may be mitigated by the tension of the first and second rear elastic cylinders 150a, 150b and transmitted to the cabin 100. Accordingly, the vertical impact at the rear side of the cabin 100 may be mitigated.

However, if the first and second rear elastic cylinders 150a, 150b extend at a predetermined angle with respect to a vertical axis extending in a vertical direction, horizontal vibrations or forward and rearward vibration as well as vertical vibrations of the cabin 100 may be mitigated.

In addition, first and second guide frames 300, 310 for mitigating vertical vibrations and horizontal vibrations of the cabin 100 may be further installed at the front of the first and second rear elastic cylinders 150a, 150b. In detail, a support 230 is installed at an upper surface of an axle case 250 of the transmission 30. Also, the guide frames 300, 310 are coupled to the upper portion of the support 230 and have a reverse "U" shape when being observed from the rear. Rollers 161 respectively installed at the guide frames 300, 310 are coupled by first and second fixed members 160a, 160b in parallel with each other in the same direction.

In other words, fixed members 160a, 160b projecting obliquely outward from the sides of the cabin 100 are installed at one side of the cabin 100. The fixed members 160a, 160b are two protruding structures spaced at regular intervals, and the rollers 161 are provided between the two fixed members 160a, 160b. The outer surfaces of the rollers 161 are wrapped by the guide frames 300, 310, and the rollers 161 may move up and down along the inner surfaces of the guide frames 300, 310.

In other words, the rollers 161 moving along the guide frames 300, 310 may move only in the vertical direction and its movement in a lateral direction is constrained, so that horizontal vibrations of the transmission 30 may be mitigated by the guide frames 300, 310 and transmitted to the cabin 100.

For example, if the tractor 10 has to turn to the left suddenly due to the road condition, the transmission 30 receives a force from left to right. However, according to the present disclosure, the rollers positioned in the first guide frame 300 are supported by the right inner surface of the first guide frame 300, and the rollers located in the second guide frame 310 are positioned on the right inner surface of the second guide frame 310, so that the impact caused by right tilting of the tractor 10 may be transmitted to the cabin 100 in a greatly mitigated state.

In addition, since the space where the rollers 161 are movable is restricted in the vertical direction by the guide frames 300, 310 and the support 230, the vertical vibrations of the transmission 30 or the impacts caused by left or right unbalance may be mitigated by the guide frames 300, 310 and transmitted to the cabin 100.

For example, if the tractor 10 travels forward on a downwardly sloping terrain to the right, the transmission 30 is subjected to a force in a right direction (in a direction from the first guide frame 300 toward the second guide frame 310). Accordingly, the driver riding in the riding and driving area 14 of the cabin 100 may feel inconvenience when driving the tractor 10 since the driver rides in the cabin 100 inclined to the right. However, according to the present disclosure, downward movement of the rollers located in the second guide frame 310 is restricted by the support 230, and upward movement of the rollers located in the sealed first guide frame 300 is restricted by the upper surface of the first guide frame 300. Thus, the impact may be greatly mitigated due to the left/right shake or imbalance of the tractor 10 may be greatly mitigated and transmitted to the cabin 100.

In addition, when the tractor 10 is traveling on a road having a protrusion (for example, a speed bump), the transmission 30 is subjected to an upward force. Accordingly, the driver riding in the riding and driving area 14 of the cabin 100 may feel the inconvenience while driving the tractor 10 since the driver rides in the cabin 100 which receives an upward force due to the transmission 30. However, according to the present disclosure, since downward movement of the rollers located respectively in the first guide frame 300 and the second guide frame 310 is restricted by the support 230, even if the tractor suddenly moves upwards, the impact is greatly mitigated.

Figure 9:
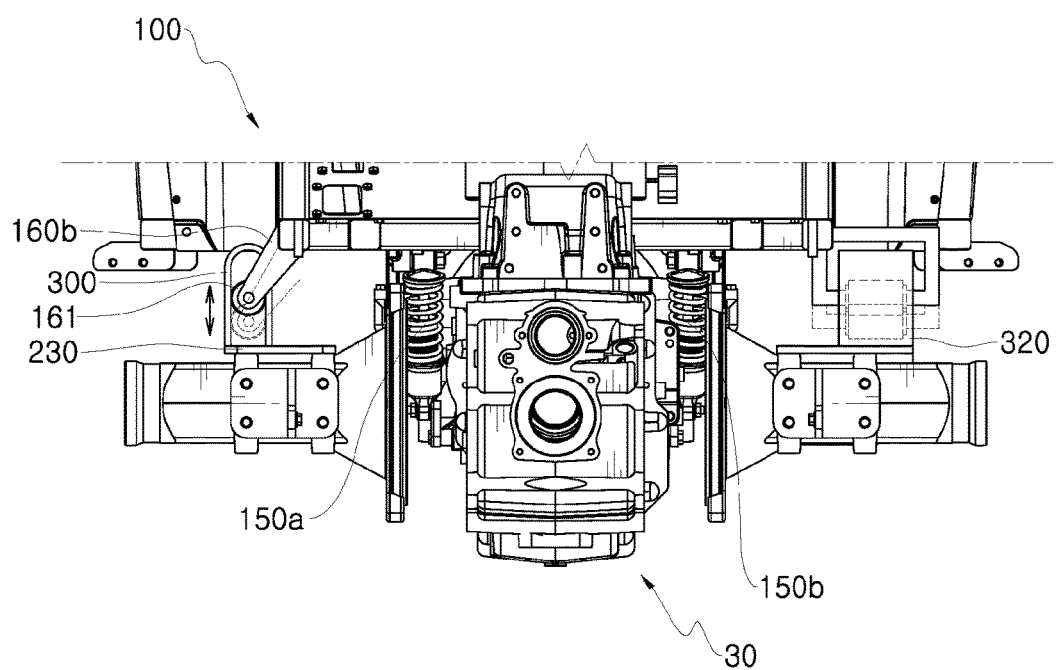
FIG. 9 is an enlarged rear view showing the portion C of FIG. 2 according to another embodiment of the present disclosure.

FIG. 9 is an enlarged rear view showing the portion C of FIG. 2 according to another embodiment of the present disclosure.

FIG. 9 shows a modified example of the embodiment illustrated in FIG. 8. In this embodiment, the first guide frame 300 and the second guide frame 320 may be installed to have opposite orientations. Thus, the rollers may be installed so that the outer surfaces of the rollers installed at the first guide frame 300 and the outer surfaces of the rollers installed at the second guide frame 320 are perpendicular to each other. In this embodiment, in addition to the effects as illustrated in FIG. 8, it is possible to mitigate forward and backward vibrations as well as horizontal vibrations and vertical vibrations, among the vibrations transmitted to the cabin 100 through the transmission 30.

For example, the first guide frame 300 may mitigate the left and right vibrations and the vertical vibrations of the transmission 30 and transmit the mitigated vibrations to the cabin 100, and the second guide frame 320 installed perpendicular to the first guide frame 300 may mitigate the forward and rearward vibrations and the vertical vibrations and transmit the mitigated vibrations to the cabin 100.

In more detail, when the tractor 10 suddenly turns to the left, since the rollers positioned in the first guide frame 300 are supported on the right inner surface of the first guide frame 300, the impact caused by the right tilting of the tractor 10 may be greatly mitigated and transmitted to the cabin 100.

As another example, when the tractor 10 has to stop suddenly, since the rollers positioned within the second guide frame 320 are supported on the inner surface of the front of the second guide frame 320, the impact caused by the forward tilting of the tractor 10 may be greatly mitigated and transmitted to the cabin 100.

As another example, when the tractor 10 is travelling on a road having a protrusion, since downward movement of the rollers respectively positioned in the first guide frame 300 and the second guide frame 320 is restricted by the support 230, the upward tilting of the tractor 10 may be greatly mitigated and transmitted to the cabin 100.

According to the present disclosure, as a configuration for coupling the transmission 30 to the cabin 100 located at the upper portion of the transmission 30, the front portions of the transmission 30 and the cabin 100 are coupled by means of the links of a '⊂' shape having the first link 121, the second link 122 and the central link 110 for directly connecting the transmission 30 and the cabin 100, and the first and second front elastic cylinders 130a, 130b whose one ends are connected to the protruding link 125, 126 located at one sides of the first link 121 and the second link 122 and the other ends are connected to one side of the transmission 30.

Therefore, the shake of the cabin 100 in a lateral direction may be mitigated by the central link 110, and the vertical impact of the cabin 100 may be mitigated by the first and second front elastic cylinders 130a, 130b.

In addition, the rear portions of the transmission 30 and the cabin 100 are coupled by connecting the first and second rear elastic cylinders 150a, 150b connecting the cabin 100 and the transmission 30, the fixed members 160a, 160b coupled to the cabin 100, and the guide frames 300, 310 of a reverse "U" shape fixed to the support 230 of the axle case 250 of the transmission 30.

By using the above configuration, vibrations generated when the engine 20 is in operation, the tractor 10 is travelling or the tractor 10 is working may be mitigated and transmitted to the cabin 100, thereby improving the ride comfort of the user.

The embodiments of the present disclosure have been described in detail with reference to the accompanying drawings, but the present disclosure is not limited to the embodiments but may be modified in various ways without departing from the scope of the present disclosure. Therefore, the embodiments in the present disclosure are not intended to limit the scope of the present disclosure but intended for illustration, and the scope of the present disclosure is not limited to the embodiments. Therefore, the embodiments described above should be understood as being illustrative in all aspects, rather than restrictive. The scope of the present disclosure to be protected should be interpreted based on the appended claims, and all equivalents thereof should be understood as falling within the scope of the present disclosure.

The invention claimed is:

1. A tractor comprising:
   a cabin (100) composed of a plurality of frames and configured to provide a seating space of a user;
   a vehicle body (200) composed of an engine (20) and a transmission (30);
   links (110, 121, 122) having one end coupled to a front portion of the cabin (100) and the other end coupled to a front portion of the transmission (30) to connect the cabin (100) and the transmission (30) at a front portion;
   first and second front elastic cylinders (130a, 130b) installed at one side of the links (121, 122), an elastic member surrounding the first and second front elastic cylinders (130a, 130b) to mitigate vibrations of the cabin (100); and
   first and second rear elastic cylinders (150a, 150b) having one end coupled to a rear portion of the cabin (100) and the other end coupled to a rear portion of the transmission (30) to connect the cabin (100) and the transmission (30) at a rear portion, an elastic member surrounding the first and second rear elastic cylinders (150a, 150b) to mitigate vibrations of the cabin (100).

2. The tractor according to claim 1,
   wherein the links include a first link (121) and a second link (122) extending in forward and rearward directions, and a central link (110) extending in a lateral direction to connect one end of the first link (121) and one end of the second link (122), and
   wherein the first and second front elastic cylinders (130a, 130b) are installed at the first link (121) and the second link (122), respectively.

3. The tractor according to claim 2,
   wherein the first and second front elastic cylinders (130a, 130b) extend upward and downward directions and are coupled to transmission side brackets (140a, 140b) formed at one side of the transmission (30) and fixed to the transmission (30).

4. The tractor according to claim 2,
   wherein when one side of the first link (121) coupled to the transmission (30) and one side of the second link (122) coupled to the transmission (30) pivot upwards, the first and second front elastic cylinders (130a, 130b) are compressed to mitigate an upward impact transmitted to the cabin (100), and
   wherein when one side of the first link (121) coupled to the transmission (30) and one side of the second link (122) coupled to the transmission (30) pivot downwards, the first and second front elastic cylinders (130a, 130b) are tensioned to mitigate a downward impact transmitted to the cabin (100).

5. The tractor according to claim 2,
   wherein the central link (110) extends in a lateral direction so that the first link (121) and the second link (122) are coupled to both ends thereof, to mitigate shaking in the lateral direction transmitted to the cabin (100).

6. The tractor according to claim 2,
   wherein a first transmission front bracket (210a) coupled to one end of the first link (121) is installed at one side of the transmission (30), and a second transmission front bracket (210b) coupled to one end of the second link (122) is installed at the other side of the transmission (30),
   wherein a hole is formed at one end of the first link (121) so that the first transmission front bracket (210a) is inserted therein and a first damper (2101a) made of an elastic material is installed at an inner circumference thereof, and
   wherein a hole is formed at one end of the second link (122) so that the second transmission front bracket (210b) is inserted therein and a second damper (2101b) made of an elastic material is installed at an inner circumference thereof.

7. The tractor according to claim 2,
   wherein a hole is formed at the other end of the first link (121) so that one end of the central link (110) is perpendicularly inserted therein and a third damper (121a) made of an elastic material is installed at an inner circumference thereof, and wherein a hole is formed at the other end of the second link (122) so that the other end of the central link (110) is perpendicularly inserted therein and a fourth damper (122a) made of an elastic material is installed at an inner circumference thereof.

8. The tractor according to claim 2, wherein a first cabin front bracket (101a) and a second cabin front bracket (101b) disposed between the first link (121) and the second link (122) and coupled to the central link (110) is installed at the front of the cabin (100), wherein a hole is formed in the first cabin front bracket (101a) so that one side of the central link (110) is inserted therein and a fifth damper (1001a) made of an elastic material is installed at an inner circumference thereof, and wherein a hole is formed in the second cabin front bracket (101b) so that the other side of the central link (110) is inserted therein and a sixth damper (1001b) made of an elastic material is installed at an inner circumference thereof.

9. The tractor according to claim 2, wherein one end of the first and second rear elastic cylinders (150a, 150b) is coupled to a cabin rear bracket (151) formed at the rear of the cabin (100), and the other end thereof is coupled to a transmission rear bracket (220) formed at the rear of the transmission (30).

10. The tractor according to claim 2, wherein protruding links (125, 126) extending in a lateral direction are installed at the first link (121) and the second link (122), respectively, and wherein the first and second front elastic cylinders (130a, 130b) are installed at the protruding links (125, 126).

11. The tractor according to claim 1, wherein a first fixed member (160a) and a second fixed member (160b) protruding outwards are installed to the cabin (100), wherein a roller (161) is installed at the first fixed member and the second fixed member, respectively, and wherein the roller (161) mitigates vertical and horizontal vibrations by means of guide frames (300, 310, 320) fixed to the transmission (30).

12. The tractor according to claim 11, wherein the guide frames include a first guide frame (300) and a second guide frame (310) installed in parallel with each other.

13. The tractor according to claim 11, wherein the guide frames include a first guide frame (300) and a second guide frame (320) installed perpendicular to each other.

* * * * *